Figure 1:
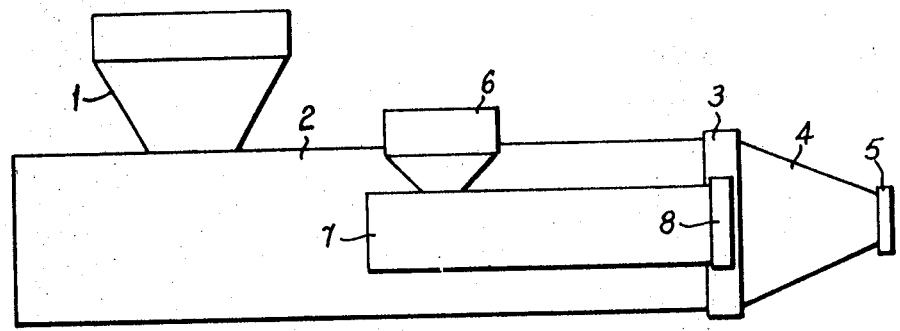

United States Patent

[11] 3,608,013

| [72] | Inventor | Raymond G. Ingham |
| | | Johnstown Nr. Wrexham, Wales |
| [21] | Appl. No. | 765,863 |
| [22] | Filed | Oct. 8, 1968 |
| [45] | Patented | Sept. 21, 1971 |
| [73] | Assignee | British Celanese Limited |
| | | London, England |
| [32] | Priority | Oct. 11, 1967 |
| [33] | | Great Britain |
| [31] | | 46403/67 |

[54] OPTICALLY PATTERNED MATERIAL
7 Claims, 2 Drawing Figs.

[52] U.S. Cl. .................................... 264/70,
18/13 P, 264/171, 264/245
[51] Int. Cl. .................................... B29c 9/00,
B29f 3/12
[50] Field of Search ........................... 18/13 P;
264/171, 174, 245, 75, 173, 211, 176

[56] References Cited
UNITED STATES PATENTS

| 2,798,258 | 7/1957 | Allan et al. .................. | 264/75 |
| 2,815,033 | 12/1957 | Braunlich ..................... | 264/171 |
| 3,274,646 | 9/1966 | Krystof ........................ | 18/13 |
| 3,422,175 | 1/1969 | Rowland ...................... | 264/171 |

Primary Examiner—Robert F. White
Assistant Examiner—Jeffery R. Thurlow
Attorney—Davis, Hoxie, Faithfull and Hapgood ABSTRACT: A method of making an optically patterned material comprising urging a molten translucent or transparent matrix polymer through a plurality of constrictions and intermittently injecting a visibly different molten polymer composition into at least some of the constrictions, thereby interrupting the flow of the matrix polymer composition therethrough, allowing the matrix polymer composition to purge the constrictions of the injected composition at the conclusion of each injection and combining and shaping the polymer composition streams emerging from the constrictions. Apparatus for making such optically patterned material is also described.

3,608,013

OPTICALLY PATTERNED MATERIAL

This invention is concerned with the manufacture of optically patterned material in which one or more thermoplastic polymer components are heterogeneously dispersed in a thermoplastic matrix. An example of such a material is the mottled, translucent sheet known as "tortoiseshell" from its similarity to the natural product and widely used in the manufacture of spectacle frames.

It has been the practice to make tortoiseshell sheet by mechanically shearing a colored molten polymer into slugs within a matrix of a second uncolored or differently colored molten polymer travelling towards the die which forms the polymers into a sheet. The spreading action of the die encourages laminar flow of the sheet-forming materials, so that the slugs themselves are spread and attenuated, giving the sheet a pleasing mottled appearance.

We have devised a method and apparatus for incorporating slugs of the dispersed polymer which require no moving mechanical parts within the matrix polymer, so that the process and apparatus are simpler.

According to the present invention a method of making an optically patterned material comprises continuously urging a molten matrix polymer composition through a plurality of constrictions and intermittently injecting a molten, visibly different polymer composition into at least some of the constrictions thereby interrupting the flow of the matrix composition therethrough, allowing the matrix composition to purge the constrictions of the injected composition at the conclusion of each injection and combining and shaping the polymer streams emerging from the constrictions.

The apparatus of this invention comprises means continuously to urge a molten matrix polymer composition through a barrier perforated by a plurality of orifices, means to inject intermittently a different polymer composition into at least some of the orifices against the pressure exerted by the matrix composition and a die for shaping the combined molten polymer stream, downstream of the barrier.

Preferably the orifices are connected along their lengths to a source of the polymer composition for injection. Thus conduits for conducting the polymer for injection may be formed in the thickness of the barrier.

The number, size and relative distribution of the orifices in the barrier may be varied to obtain various optical effects which are further variable by changes in the periods of intermittent injections, and by changes in the intervals between successive intermittent injections.

It is understood that the streams of molten polymers issuing from the constrictions combine beyond the constrictions and are shaped by the die, for example into a rod, sheet or block, or the shaped body may be granulated or otherwise rendered suitable for remelting and forming in another and separate process.

In the manufacture of tortoiseshell sheet it is preferred that the barrier has orifices equipped for injection, spaced across the barrier and disposed between two slits or series of orifices through which the matrix polymer flows uninterruptedly during the sheet-forming process, in such a way that the material issuing from the barrier has a laminar construction in which layers of the matrix composition lie one on each side of a layer in which the slugs of the injected composition are dispersed in more of the matrix composition. This relative disposition of the layers is maintained through the sheet forming process due to the laminar flow of molten polymeric materials induced in such circumstances. The product sheet therefore contains a core of mottled material and an optically homogeneous surfacing material. In these and other circumstances we prefer that the matrix composition is transparent. Yet other circumstances may require that the composition is translucent.

We also prefer to use identical polymer components in all the polymer compositions employed in making the optically patterned material, the compositions differing only in the substances they contain which affect their appearance, for example dulling agents, dyes, pigments and fluorescent additives.

The polymers may be any thermoplastic sheet-forming material for example polyvinyl chloride, polystyrene and vinyl chloride/vinyl acetate copolymers. However, for the manufacture of tortoiseshell sheet, we prefer to employ secondary cellulose acetate.

The optically patterned material of this invention may be used in the manufacture of spectacle frames and combs and to obtain decorative sheets and panels for wall and floor coverings, and for decorating or protecting other surfaces. Various mottled and particolored articles may also be molded from the granulated optically patterned material.

Figure 2:
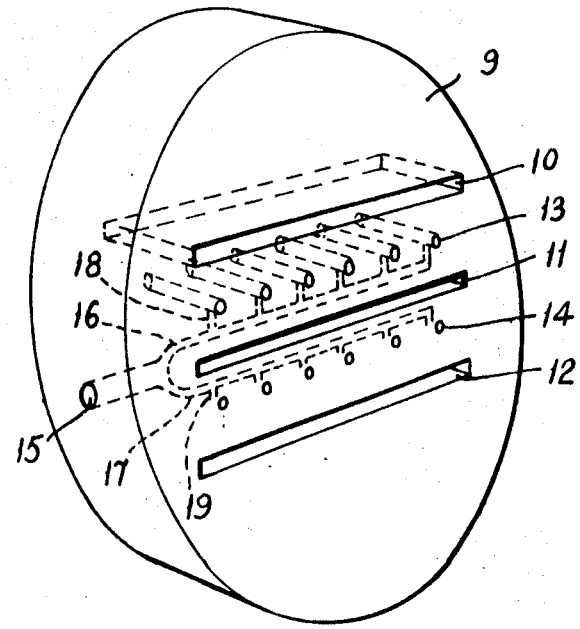

An embodiment of the invention is illustrated, by way of example, in the accompanying drawing, in which FIG. 1 is a schematic elevation of a sheet-forming apparatus, and FIG. 2 is a perspective view of the perforated barrier.

Referring to FIG. 1, a screw extruder for the matrix composition comprises a hopper 1 on a barrel 2 terminating in a perforated barrier 3. On its output side, the barrier 3 is connected through a duct 4 to a slit die 5 for the extrusion of sheet. Alongside this first screw extruder, there is a smaller extruder for melting and metering a different composition, having a hopper 6 on a barrel 7 terminating in a head 8 which is connected at its outlet with a transverse bore 15 (see FIG. 2) of the barrier 3.

In the perspective view of the barrier 3 shown in FIG. 2, a plate 9 is perforated in its thickness by three parallel slots 10, 11 and 12 and two rows 13 and 14 of circular bores between the slots. The transverse bore 15 divides into conduits 16 and 17, each of these conduits having a series of individual connections 18, 19, respectively, with the circular bores of the adjacent row 13, 14, respectively.

In operation, a clear uncolored matrix composition containing cellulose acetate, was melted and metered in the barrel 2 and thereby urged through the slots 10, 11 and 12 and the rows 13 and 14 of circular bores. Pulses of a brown pigmented cellulose acetate composition were metered intermittently from the head 8 of the smaller extruder into the traverse bore 15, along the conduits 16 and 17 to emerge from the connections 18 and 19 in each of the circular bores of rows 13 and 14, forming slugs therein. The injection of the brown pigmented composition interrupted the flow of the matrix composition through the circular bores, whilst allowing an uninterrupted flow through the slots. At the end of each pulsed injection, the matrix composition resumed its flow through the rows, purging the slugs from the circular bores.

The melt on the output side of the barrier had a laminar structure of three homogeneous layers interleaved with two heterogeneous layers. This structure was maintained to a considerable extent as the melt passed through the duct 4 to the die 5. The spreading actions of both the duct and the die encouraged laminar flow in both polymer compositions with the result that each layer was attenuated with a negligible transfer of material across the thickness of the melt. The sheet issuing from the die had the pleasing mottled appearance of tortoiseshell.

What I claim is:

1. A method of making an optically patterned material comprising urging a molten translucent or transparent matrix polymer composition through a plurality of flow channels extending through a barrier member and intermittently injecting a visibly different molten polymer composition into less than all of the flow channels, thereby interrupting the flow of the matrix polymer composition through those flow channels, resuming the flow of the matrix polymer composition to purge said flow channels of the injected composition at the conclusion of each injection and, in a duct, combining and shaping the polymer composition streams emerging from the flow channels.

2. A method as claimed in claim 1 for making an optically patterned sheet, comprising forming parallel laminar streams of the translucent or transparent matrix polymer on either side of the streams emerging from the flow channels, combining all the streams in one laminated sheet of molten polymer and spreading the sheet to form a thinner laminated sheet.

3. A method as claimed in claim 2 in which the matrix polymer composition and the injected polymer composition have similar polymer components.

4. A method as claimed in claim 3 for the production of tortoiseshell in which the polymer component of both polymer compositions is secondary cellulose acetate.

5. Apparatus for making an optically patterned material from at least two visibly different polymer compositions, comprising a barrier having a plurality of flow channels extending therethrough, means continuously to urge a molten matrix polymer composition through the flow channels, means to inject intermittently a molten, visibly different polymer composition into less than all of the flow channels against the pressure exerted by the matrix polymer composition, a duct at the output side of the barrier in which the streams of polymer composition issuing from the flow channels may combine, and a die closing the outlet from the duct.

6. Apparatus as claimed in claim 5 in which the means to inject the polymer composition, is a manifold connection to the orifices and a pump adapted intermittently to urge the polymer composition through the manifold.

7. Apparatus as claimed in claim 6 in which the barrier is additionally perforated by parallel slits on either side of a likewise parallel, linear array of the orifices, and through which the matrix polymer may flow uninterruptedly, and the width of the duct becomes progressively broader from the barrier to the die.